Feb. 17, 1970    C. STECKLE    3,495,805
GATE VALVE
Filed Feb. 23, 1968    2 Sheets-Sheet 1
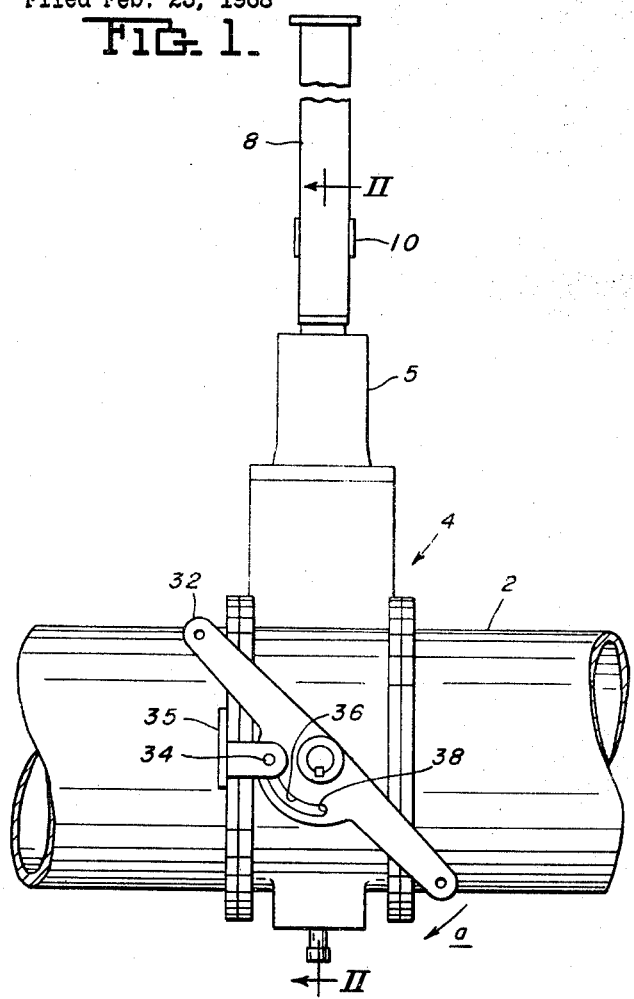
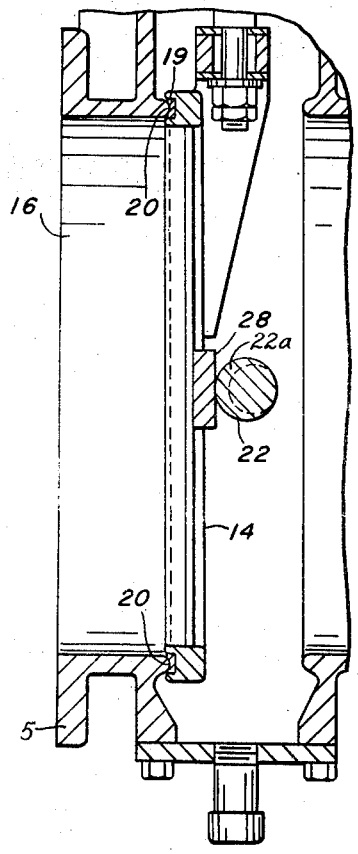
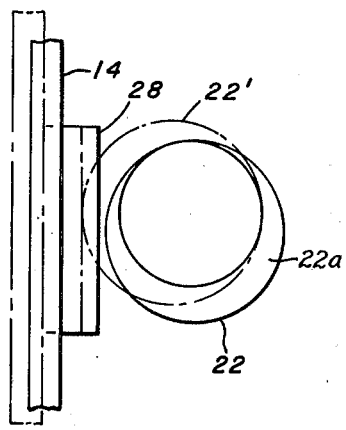
INVENTOR.
CHARLES STECKLE
By Frank C. Manak III
Attorney

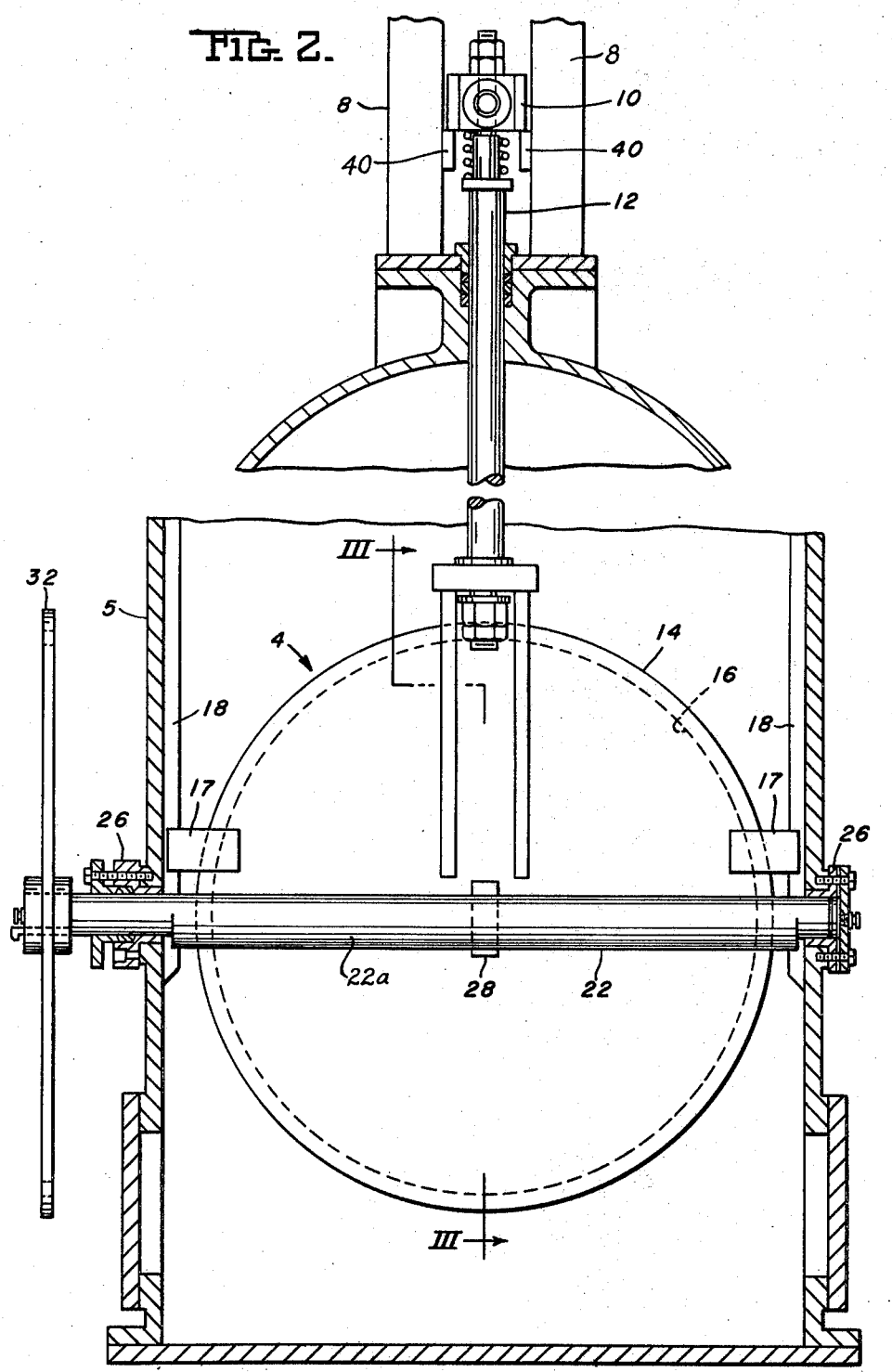

United States Patent Office 3,495,805
Patented Feb. 17, 1970

3,495,805
GATE VALVE
Charles Steckle, McCandless Township, Allegheny County, Pa., assignor to United States Steel Corporation, a corporation of Delaware
Filed Feb. 23, 1968, Ser. No. 707,639
Int. Cl. F16k 25/00, 3/00
U.S. Cl. 251—187                    6 Claims

ABSTRACT OF THE DISCLOSURE

A gate valve having an improved means for securing the valve plate against its seat. The plate is pressed against the valve seat by a means separate from the means for sliding the valve plate into alignment with the fluid opening in the valve body. This enables a very tight seating of the valve plate against its seat, and any soft dirt lodging between the valve plate and seat is extruded out.

---

This invention relates to gate valves, particularly the kind which are used to seal off the flow of gas.

When a gate valve is employed in a gas pipe line, dirt often builds up on the valve plate and on the seat which the valve plate engages to seal off the flow of fluid. This dirt is a considerable problem, for instance, in the shut-off valves in the gas lines feeding the burners of stoves for heating blast furnace intake air. The dirt is soft when it is first deposited in the valve, but when it is allowed to remain, it hardens and is very difficult to remove, even by scraping. The dirt must be removed, because when allowed to accumulate, it prevents the valve plate from closing tightly against its seat, thus causing gas leakage.

Conventional gate valves have been very susceptible to dirt building up on the valve plate and seat. Usually, a camming surface is provided somewhere on the valve body. As the valve plate is pushed into alignment with the valve opening, a wedge surface on the back of the plate engages the camming surface on the valve body, forcing the valve plate against its seat. The wedge surface on the valve plate must be at a substantial angle to the direction of motion of the valve plate across its seat, so that the valve plate is given sufficient lateral motion to engage the valve seat and press firmly against it. However, such a wedge angle also diminishes the amount of force transmitted to the valve plate by the camming surface and, in turn, the amount of force transmitted by the valve plate against its seat. Thus, when soft dirt is deposited on the valve plate or its seat, the force of the plate against the seat is not enough to extrude the dirt out, and a poor valve seating results. Over a period of time, the dirt hardens and builds up unevenly, resulting in a very poor valve seating that leaks fluid at a substantial rate.

An object of my invention is to provide a gate valve having an improved means for securing the valve plate against its seat, so that the valve can be tightly shut without substantial interference from accumulated dirt between the valve plate and seat.

This and other objects will be more apparent from the following detailed description of my invention and the attached drawings, in which:

FIGURE 1 is an elevation of a fluid pipe line having a gate valve installed therein;

FIGURE 2 is an enlarged section of the gate valve shown in FIGURE 1, taken along line II—II of FIGURE 1;

FIGURE 3 is a sectional view of the gate valve of FIGURES 1 and 2 taken along line III—III of FIGURE 2; and FIGURE 4 is an enlargement of a portion of the sectional view of FIGURE 3.

In FIGURE 1, a pipe line 2 is shown with a gate valve 4 (FIGURES 1, 2). The gate valve 4 includes a body 5 (FIGURE 1, 2). on top of which are mounted valve stem guides 8. A yoke 10 (FIGURES 1, 2), more clearly seen in FIGURE 2, slides between the stem guides 8. This yoke 10 is attached to a valve stem 12 (FIGURE 2) and is moved up and down to open and close the gate valve 4 by a suitable operating means, not shown in the drawings.

As shown in FIGURES 2 and 3, a valve plate 14 is fixed to the lower end of the valve stem 12, and is designed to cover a fluid opening 16 (FIGURES 2, 3) in the body 5. Lugs 17 (FIGURE 2) mounted on the valve plate 14 ride loosely in slots 18 in the inner wall of valve body 5, to restrict lateral movement of the valve plate 14 as it is moved up and down. A sealing ring 19 (FIGURE 3), preferably of silicone rubber, is provided around the circumference of the valve plate 14. When the valve plate 14 is tightened against the body 5 to close the opening 16, as shown in FIGURE 3, sealing ring 19 engages a valve seat 20 around the opening 16.

In order to press the valve plate 14 firmly against the valve seat 20, an eccentrically mounted shaft 22 (FIGURES 2, 3, 4) is held rotatably in bearings 26 (FIGURE 2) in the wall of valve body 5. When the eccentric shaft 22 is rotated to a valve sealing position 22′, as shown in chain lines in FIGURE 4, the eccentric portion 22a of the shaft 22 acts as a lever means and engages a pressure plate 28 (FIGURES 2–4) on the back of valve plate 14 and presses the sealing ring 19 firmly against the valve seat 20. The force transmitted to the valve seat 20 by the turning of the eccentric shaft 22 is dependent upon the extent to which both the valve plate 14 and the shaft 22 are deflected when the shaft 22 is in its chain line valve sealing position (FIGURE 4).

A handle or arm 32 (FIGURES 1, 2) is secured to the shaft 22 outside the body 5 of the gate valve 4. The handle 32 is turned manually to force the eccentric shaft 22 against the valve plate 14. If the eccentric shaft 22 has a large enough maximum radius from its axis of rotation, the handle 32 may be turned until the limit of the operator's physical strength is reached. This will insure a force on the valve plate 14 that is easily enough to extrude the dirt from between the sealing ring 19 and the valve seat 20. If on the other hand the maximum radius of the shaft 22 is small enough to make it possible for the shaft to be turned past the point of maximum force on the valve plate 14, then a pin 34 (FIGURE 1) should be provided to prevent further rotation of the handle or arm 32 when the maximum sealing force on the valve plate 14 is reached. The pin 34 is connected to the valve body 5 by a bracket 35 (FIGURE 1). Preferably, an arcuate slot 36 (FIGURE 1) is provided in the handle 32, and the pin 34 rides in the slot until contacted by slot end 38.

Referring now to the valve stem portion of the gate valve 4 in FIGURE 2, stops 40 are mounted on the valve stem guides 8. These stops 40 are designed to engage the yoke 10 on the valve stem 12 when the valve plate 14 is aligned with the fluid opening 16 in the valve body 5. The valve plate 14 is thus prevented from moving beyond its valve closing position and is accurately positioned in front of the opening 16 before the ecentric shaft 22 is tightened against it.

In operation, the gate valve 4 is closed by first moving the valve plate 14 into alignment with the fluid opening 16. This is done by moving the yoke 10 on valve stem 12 against the stops 40 by appropriate drive means (not shown). The valve operator then turns the handle 32 clockwise, as shown by arrow a in FIGURE 1, until the handle 32 will turn no further either because of end 38 of slot 34 engaging the pin 36 or because the radius of the eccentric shaft at its point of contact with pressure plate 28 makes further turning physically impossible. In this position, the eccentric shaft 22 holds the valve plate 14 pressed against the valve seat 20, extruding out any substantial dirt deposits which may have been left on the valve seat 20. To open the valve, the handle 32 is simply turned back to its original position and the valve stem 12 is operated to pull the valve plate 14 out of alignment with the fluid opening 16.

I claim:
1. A gate valve comprising:
   (a) a body member having a wall provided with an opening for the passage of a fluid therethrough and a valve seat on said wall surrounding said opening,
   (b) a valve plate slidably mounted within said body member and having a path of movement into and out of aligned position in alignment with said opening,
   (c) sealing means on said valve plate which, when said valve plate is in said aligned position, is engageable with said valve seat,
   (d) actuating means positioned normal to said opening for passage of a fluid therethrough including a valve stem attached to said valve plate for sliding said valve plate into and out of said aligned position,
   (e) a shaft rotatably mounted in said body member positioned adjacent said valve plate on the opposite side from said valve seat, and having a rotational axis disposed substantially transverse to said path of movement of said valve plate into and out of said aligned position, and
   (f) cam means fixed to said shaft,
      (1) said cam means, when turned by the rotation of said shaft, engaging said valve plate when said valve plate is in said aligned position to move said valve plate laterally into sealing engagement with said valve seat.

2. The gate valve of claim 1 including means for turning said shaft so as to turn said locking means into and away from said valve sealing position.

3. The gate valve of claim 1 in which said locking means is in the form of a section of said shaft that is eccentrically positioned with respect to said rotational axis.

4. The gate valve of claim 1 wherein said means for sliding said valve plate into and out of said aligned position includes:
   (a) a rod connected to said valve plate,
   (b) a flange surface on said rod,
   (c) guide means on said body member, and
   (d) stop means mounted on said body member adjacent said guide means and positioned to engage said flange surface when the valve plate is in said aligned position, thereby properly positioning said valve plate in said aligned position.

5. The gate valve of claim 1 including:
   (a) an arm mounted on said shaft, and
   (b) means fixed to said body member for engaging said arm and limiting the rotation of said shaft in one direction when said locking means is in said valve sealing position.

6. The gate valve of claim 1 including a pressure plate on said valve plate engageable with said locking means.

References Cited

UNITED STATES PATENTS

| | | | |
|---|---|---|---|
| 1,126,395 | 1/1915 | Clark | 251—187 XR |
| 1,536,300 | 5/1925 | Longtine | 251—203 |
| 1,391,987 | 9/1921 | Whaley | 251—187 |

FOREIGN PATENTS 630,742  6/1936  Germany.

HAROLD W. WEAKLEY, Primary Examiner

U.S. Cl. X.R.

251—203, 329